United States Patent [19]

Shortridge

[11] Patent Number: 4,911,021

[45] Date of Patent: Mar. 27, 1990

[54] AIR SAMPLING APPARATUS

[76] Inventor: Ernest R. Shortridge, 5024 E. Desert Park La., Paradise Valley, Ariz. 85253

[21] Appl. No.: 214,686

[22] Filed: Jul. 1, 1988

Related U.S. Application Data

[62] Division of Ser. No. 853,753, Apr. 18, 1986, Pat. No. 4,754,651.

[51] Int. Cl.$^4$ .............................................. E01F 1/46
[52] U.S. Cl. .................................................. 73/861.66
[58] Field of Search ............ 73/861.65, 861.66, 861.67

[56] References Cited

U.S. PATENT DOCUMENTS

| 1,295,046 | 2/1919 | Lohnes | 73/861.67 |
| 3,751,986 | 8/1973 | Lambert | 73/861.66 |
| 4,154,100 | 5/1979 | Harbaugh et al. | 73/861.66 |
| 4,545,260 | 10/1985 | Benton | 73/861.65 |
| 4,677,858 | 7/1987 | Ohnhaus | 73/861.65 |
| 4,701,661 | 11/1987 | Evers | 73/861.66 |

*Primary Examiner*—Herbert Goldstein
*Attorney, Agent, or Firm*—H. Gordon Shields

[57] ABSTRACT

Air sampling apparatus usable with airflow measuring equipment includes probe apparatus for inserting into airflows remote from a meter and the probe apparatus includes wands having ports for communicating with an airflow and boundary layer separation slots to control the separation of boundary layer airflow between the ports, and includes a manifold grid having a plurality of ports for sensing air pressure over a relatively large area.

8 Claims, 4 Drawing Sheets

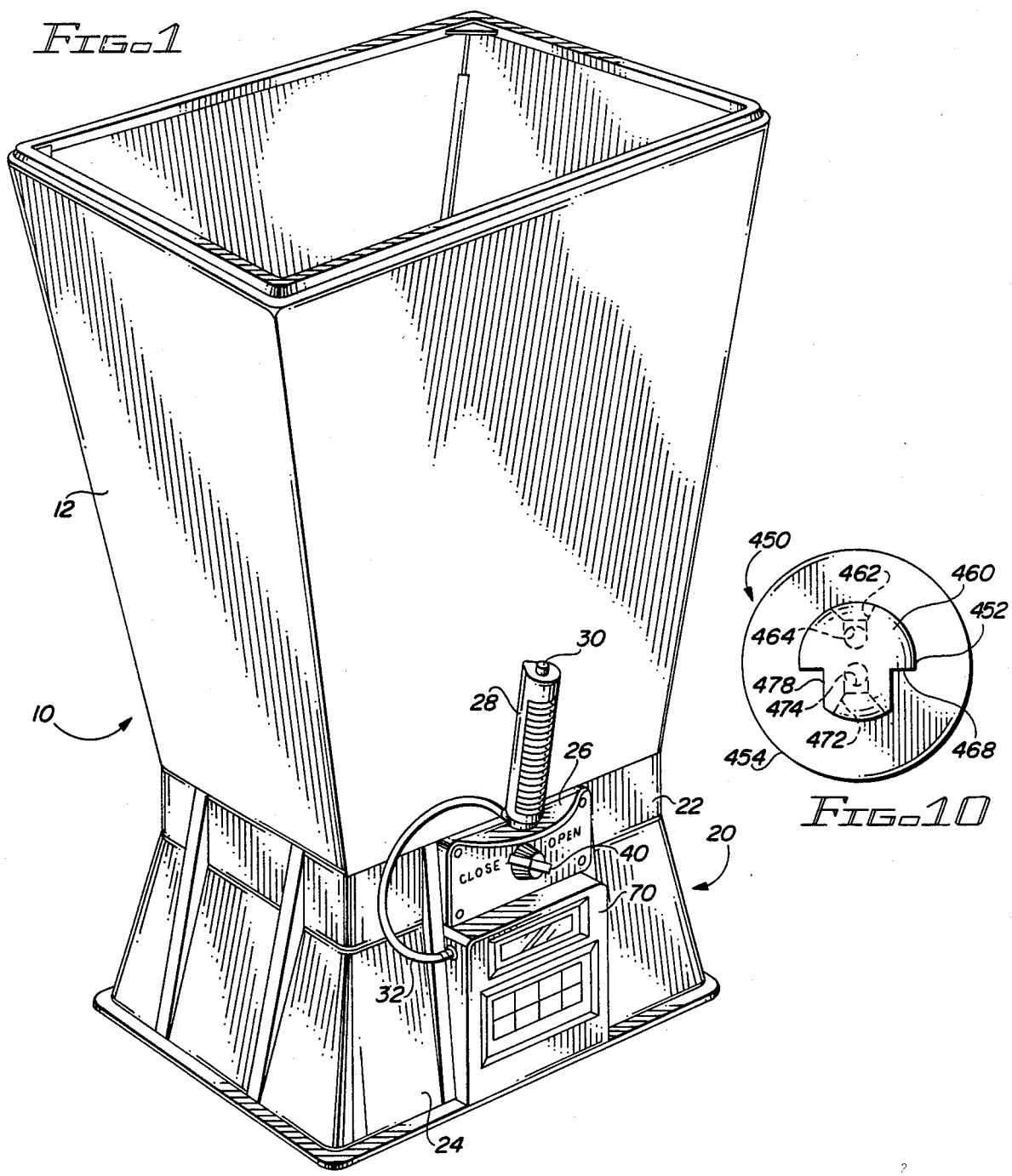
Fig. 1
Fig. 10
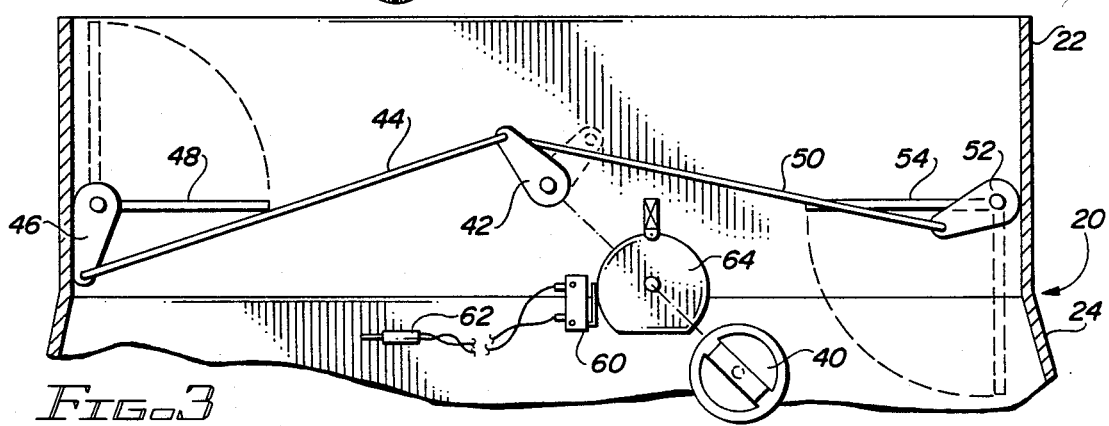
Fig. 3

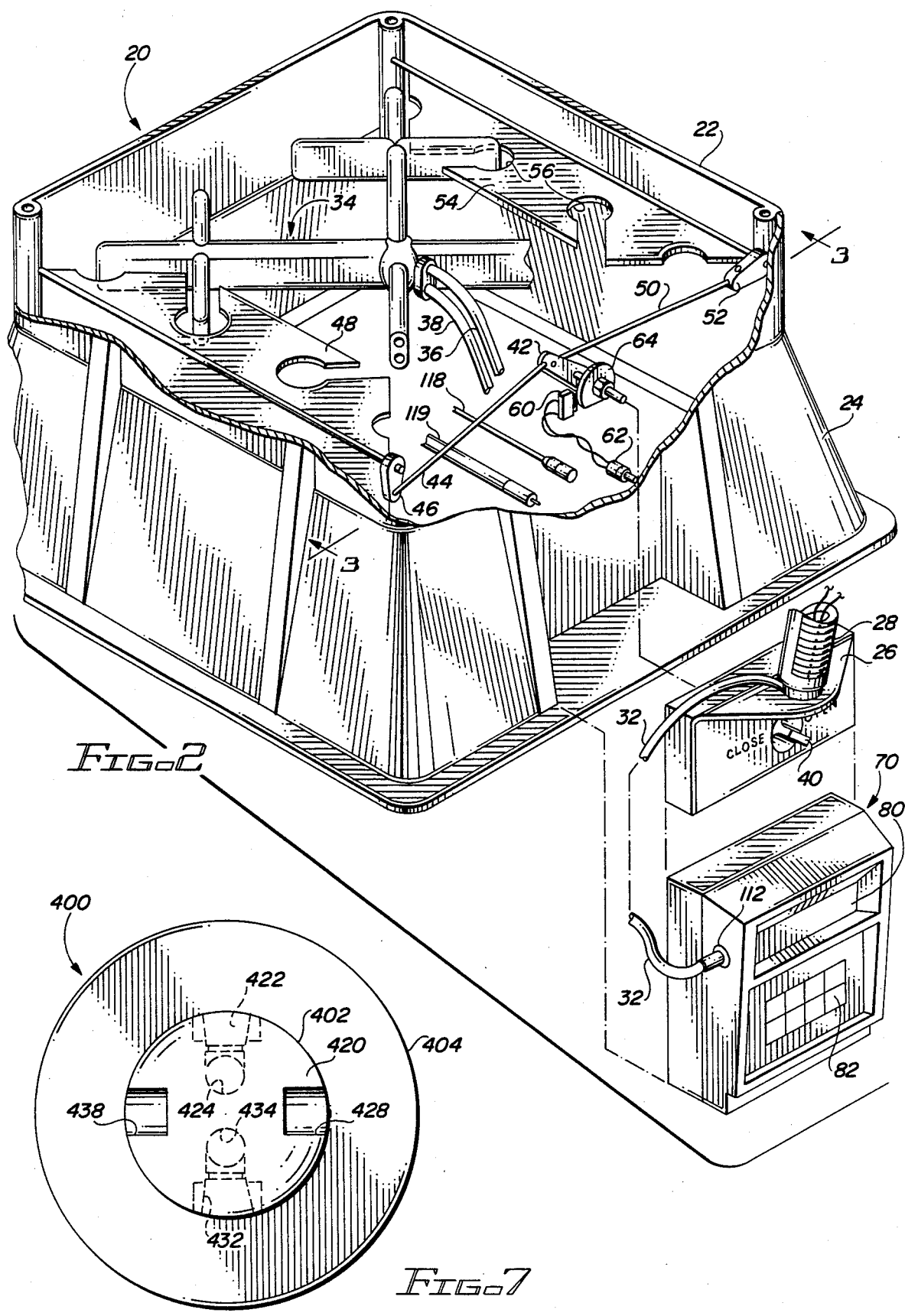

AIR SAMPLING APPARATUS

CROSS REFERENCE TO RELATED APPLICATION

This application is a divisional application of Ser. No. 853,753, filed Apr. 18, 1986, which issued into U.S. Pat. No. 4,754,651 on July 5, 1988.

BACKGROUND OF THE INVENTION

1. Field of the Invention

This invention relates to apparatus for sampling air, and, more particularly, to apparatus for sampling air over a wide dynamic range.

2. Description of the Prior Art

U.S. Pat. No. 4,481,829, dated Nov. 13, 1984, discloses basic prior art apparatus, which includes a base frame and a hood securable to the base frame for measuring air flow for the purpose of balancing air flow systems. The '829 patent also discloses different types of pressure sensing grids disposed within the frame. Baffle systems are also disclosed for use with the pressure sensing grids to enable relatively low air flows to be measured.

The apparatus of the present invention may be considered as a second generation to the apparatus disclosed in the '829 patent.

The advent of integrated circuits has encouraged the use of microprocessors for numerous control and calculating functions. Microprocessors are used in the apparatus of the present invention, along with other electronic elements and with mechanical elements.

Prior art air measuring apparatus is generally limited in the data provided. For example, so far as is known, none of the prior art devices is able to provide back pressure compensation, and none is able to correct for air density. Moreover, none is able to measure relatively low air flows, and none is able to measure air flows over a relatively wide dynamic range. The apparatus of the present invention measures air flows from as low as about twenty-five or thirty feet per minute air velocity up to about twenty-five thousand feet per minute air velocity. The latter dynamic range represents a turn-down range of about one thousand to one, or a range in terms of inches of water column from about 0.00004 inches to about fifty-eight inches.

The apparatus of the present invention overcomes the limitations of the prior art by automatically compensating for back pressure and for automatically correcting for air density. Accordingly, air measurement data are correct wherever the apparatus is used, whether at sea level, below sea level, or above sea level.

Relatively low air flows may be measured with a hot wire anemometer, but the same hot wire element may not also be used to measure relatively high air flows. Also, since a hot wire anemometer requires heat, the hot wire element interferes with its own environment by creating its own convection currents. These convection currents interfere with the flows being measured, particularly when the flows are relatively small. That is, the smaller the air flow being measured, the greater the interference with the air flow caused by the hot wire elements.

SUMMARY OF THE INVENTION

The invention described and claimed herein comprises apparatus for measuring air velocity, airflow, air temperature, air humidity, air differential pressure, and absolute pressure, and to automatically correct various air measurements for the effects of temperature, velocity, barometric pressure, and humidity, and the apparatus includes elements for sensing the temperature and humidity of air, and for sensing air pressure, and for converting the sensed data into the desired information. A grid for sensing total pressure and static pressure at a plurality of locations within a predetermined area is utilized, and flaps are inserted into the flowing air for providing information to compensate for the back pressure caused by the apparatus itself. The flaps are mechanically actuated. Microprocessors are used to process the sensed pressure to provide the desired information. A multifunction keyboard allows an operator to obtain selective information, and the desired information is visually displayed. Other air pressure sampling devices are used under various circumstances to provide input data for the microprocessors in order to provide other information.

Among the objects of the present invention are the following:

To provide new and useful air measurement apparatus;

To provide new and useful apparatus for measuring temperature, velocity, humidity, and pressure of air;

To provide new and useful apparatus for measuring airflow and for compensating the measurement for the effects of back pressure caused by the apparatus;

To provide new and useful apparatus for sensing air pressures and to compensate the air velocity and flow sensed for the effects of temperature, barometric pressure, and humidity;

To provide new and useful apparatus for sensing total air pressure and static air pressure;

To provide new and useful apparatus for measuring airflows over a relatively wide dynamic range;

To provide new and useful apparatus for measuring relatively low airflows; and

To provide new and useful grid apparatus for compensating for the effects of back pressure in pressure sensing apparatus.

BRIEF DESCRIPTION OF THE DRAWING

FIG. 1 is a perspective view of apparatus including the present invention.

FIG. 2 is a perspective view of a portion of the apparatus of FIG. 1.

FIG. 3 is a view of a portion of the apparatus of FIG. 2, taken generally along line 3—3 of FIG. 2.

FIG. 7 is a view of the apparatus of FIG. 6, taken generally along line 7—7 of FIG. 6.

FIG. 10 is a front view of the apparatus of FIG. 8, taken generally along line 10—10 of FIG. 9.

DESCRIPTION OF THE PREFERRED EMBODIMENT

INTRODUCTION

Figure 4:
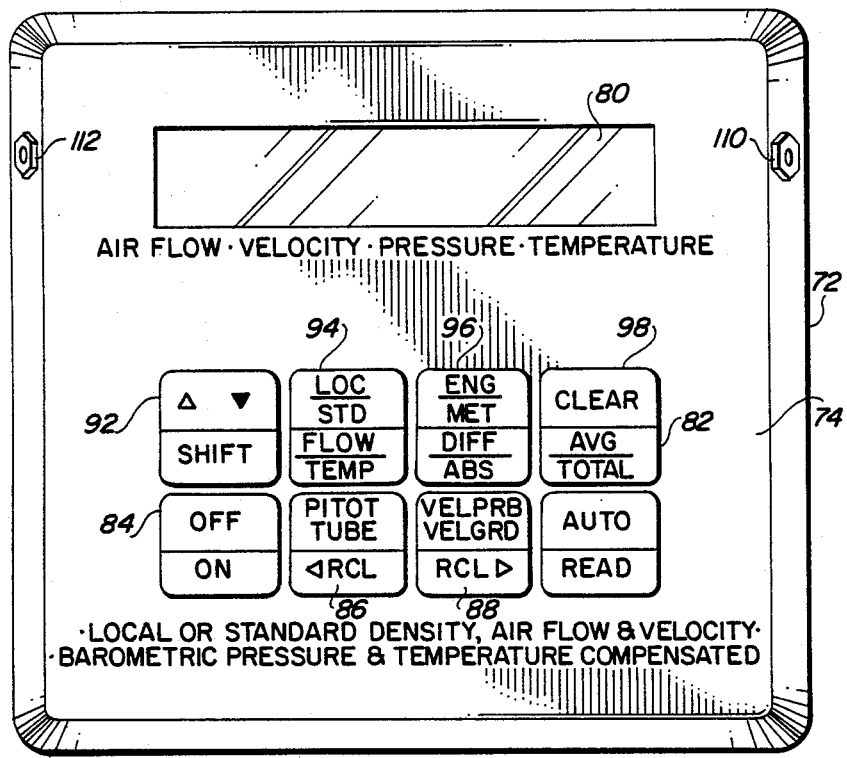
FIG. 4 is an enlarged front view of a portion of the apparatus of the present invention.

The apparatus of the present invention comprises electronic micromanometer apparatus for providing information, digitally displayed, relating to the measurement of various characteristics of air. The term "air" is used throughout the specification. However, it will be understood that with modifications to software for the microprocessors used in the apparatus, the characteristics of virtually any gas may be measured. Indeed, some of the mechanical pressure sampling devices may be used also to sample the pressure of liquids, as well as the gaseous fluids for which the devices are primarily designed.

Several different pressure sensing or sampling devices are disclosed. With one device for measuring volume flows, air flows through a funnel apparatus and through a known cross-sectional area and past a grid manifold disposed in the funnel apparatus. Since the area of the funnel is known, the airflow in terms of cubic feet per minute may be provided. The back pressure caused by the funnel apparatus itself is automatically compensated for. Also, by sensing the absolute pressure of the air and the temperature of the air, the airflow may be corrected for air density. If desired, the humidity of the air may also be sensed to provide an additional correction factor.

With other pressure sampling devices, not including area restrictions, air velocity is measured. Two such devices are described in detail. One such device is sometimes referred to as a "velprobe" or merely as a probe. The probe includes an elongated wand-like element disposed in an airflow.

Another device is sometimes referred to as a "velgrid" sampling device. The velgrid device includes a grid manifold secured to an elongated handle. The grid manifold is substantially identical to the grid manifold used in the funnel apparatus and it accordingly samples air pressure at a plurality of locations and provides an average differential pressure. The apparatus may be used, for example, to sample air pressures at the face of a filter or merely at a plurality of locations in a room.

Other air sampling devices, such as the well known pitot tube, may also be used with the apparatus of the present invention.

AIRFLOW SAMPLING APPARATUS

FIG. 1 is a perspective view of airflow sampling apparatus 10 incorporating the apparatus of the present invention, and comprising a use environment, or one of its use environments, of the apparatus of the present invention.

In FIG. 1, airflow sampling or air balancing apparatus 10, used generally for balancing the flow of air in ductwork, is illustrated. A funnel 12 is secured to a base 20. The funnel 12 is preferably made of relatively close or tightly woven material so as to substantially eliminate the leakage of air through the material and so that the airflow is directed to the funnel 12, and through the base 20. The funnel is appropriately supported by structural elements, as required. The cross section of the funnel 12 is generally rectangular. Air flowing through the apparatus 10 flows through a known cross sectional area and accordingly airflow information may be provided.

The base 20 includes two portions, a generally rectangular upper portion 22 and a generally truncated pyramidally configured lower portion 24. The base 20 may be made of appropriate plastic or polymer material.

Secured to the front of the base 20 is a flap control housing and plate 26. Extending outwardly from the upper portion of the plate 26 is a flange which supports a handle 28. The handle 28 includes an electrical switch 30. The switch 30 is connected to an electrical cable 32 which in turn extends to a meter 70. The function of the thumb switch 30, the cable 32, and the meter 70 will be discussed in more detail below. The meter 70 and the housing and bracket plate 26 are shown spaced apart from the base 20 in FIG. 2.

A flap selector knob 40 extends outwardly from the control housing secured to the bracket plate 26. The flap selector knob 40 is used in conjunction with a pair of flaps shown in FIGS. 2 and 3 and discussed in detail therein.

FIG. 2 is a perspective view of the base 20, showing various elements associated with the apparatus of the present invention and disposed within the base 20. The hood 12 has been removed from the base 20, as shown in FIG. 2, for the convenience of the elements within the base 20.

Appropriately supported within the upper portion 22 of the base 20 is a manifold 34. The manifold 34 is disclosed in detail in U.S. Pat. No. 4,481,829, referred to and briefly discussed above.

A pair of flexible tubes or conduits, either plastic or rubber or the like, extend from the manifold 34 to the back of the meter housing 70. The conduits include an upper (total pressure) conduit 36 and a lower (static pressure) conduit 38. The conduits 16 and 38 will be discussed in more detail in conjunction with FIGS. 5 and 6. In actuality, the apparatus of the present invention will operate regardless of the direction of airflow, and accordingly the conduits 36 and 38 are referred to as total pressure and static pressure conduits primarily for convenience. Again, this wil be discussed in detail below.

A pair of flaps 48 and 54 are appropriately journaled for rotation on the base 20. The flaps 48 and 54 are disposed within the upper portion 22 of the housing 20, and are journaled for rotation on oppositely disposed walls or sides of the upper portion 22. The flaps 48 and 54 are shown in their closed position in FIG. 2.

It will be noted that, in their closed positions, the flaps 48 and 54 extend into the base 22, substantially perpendicularly to the walls of the upper portion 22 of the base 20. In such a position, they block a portion of the air flow through the base 22. The area of the flaps 48 and 54 is known, and the area of the base 22 is also known. Accordingly, the percentage of the total area of the base 22 which the flaps 48 and 54 occupy or block, in their closed position, can be calculated. The effect of not only the flaps 48 and 54, but also the effect of the apparatus 10, may be appropriately determined for any airflow to which the apparatus 10 is applied.

FIG. 3 is a semi-schematic representation taken generally along line 3—3 of FIG. 2, illustrating the opening and closing of the flaps 48 and 54 by means of mechanical linkage through the flap selector control knob 40.

In FIG. 2, part of the upper portion 22 of the base 20 has been broken away to show the linkage for actuating the flaps 48 and 54. In FIG. 3, the linkage is shown in detail. The knob 40, mounted on the bracket plate 26, is mechanically connected to a link 42. The connection between the knob 40 and the link 42 is schematically illustrated. The link 42 is appropriately secured for a pivoting movement on the base 20, and specifically to the front wall of the upper portion of the base 20.

A pair of rods 44 and 50 are in turn connected to the link 42 and extend outwardly therefrom. The rods 44 and 50 are connected to the link 42 remote from the pivot point of the link. the link 42 pivots about a point on its lower end, and the rods 44 and 50 are accordingly appropriately secured to the upper end of the link.

The end of the rod 44 remote from the link 42 is secured to an arm 46 of the flap 48. The arm 46 extends downwardly from the flap 48, as shown in Fig. 3, substantially perpendicularly to the flap 48. The arm 46 is secured to the flap 48 about the pivot point or pivoting access of the flap 48. As indicated before, the flap 48 is appropriately secured for pivoting motion or movement on the upper portion 22 of the base 20.

The rod 50 extends from the link 42 to an arm 52. The arm 52 is secured to the flap 54 on the pivot axis of the flap 54. There is an angular displacement between the arm 52 and the flap 54, but it is, as shown in FIG. 3, substantially less than the angular orientation between the arm 46 and the flap 48.

As shown in FIGS. 2 and 3, the flaps 48 and 54 are in their closed position, in which they are disposed substantially horizontally and aligned with each other. They stand, as indicated, substantially perpendicularly to the air flowing through the apparatus 10, and by the manifold 34 within the base 20. When the switch 40 is rotated approximately ninety degrees or so clockwise, as shown in FIGS. 2 and 3, the link 42 pivots through the same angular distance. The pivoting of the link 42 causes a movement of the rods 44 and 50 and there is a corresponding pivoting movement of the arms 46 and its flap 48 and the arm 52 and its flap 54.

It will be noted, that with the clockwise pivoting of the link 42, there is a counterclockwise pivoting of the arm 46 and the flap 48 to the position shown in phantom in FIG. 3. At the same time, there is a counterclockwise pivoting of the arm 52 and its flap 54, also to the position shown in phantom in FIG. 3. Thus, in the open position of the flaps 48 and 44, the flap 48 extends upwardly from its pivot point and the flap 54 extends downwardly from its pivot point.

In the open position of the flaps 48 and 54, the flaps 48 and 54 are disposed substantially parallel to their adjacent walls, presenting minimum frontal surface area of the flow of air to the base 20 and accordingly having minimum interference effect on the airflow. In the open position, the flap 48 extends upwardly and the flap 54 extends downwardly. The flaps 48 and 54 are parallel to each other, but they extend in opposite directions to offset any effects of their presence in the air stream in their open position with respect to reversal of flow direction.

From FIG. 2, it will be noted that the configuration of the flaps is not regular. There are cutout portions to accommodate the arm members of the manifold 34 to which the flaps are adjacent. The flaps are preferably disposed, in their closed, or horizontal, position, about in the middle of the manifold 34, horizontally speaking. That is, the flaps are in substantially the same plane as the manifold and about at the midpoint between the top and bottom of the manifold.

The apparatus 10, and the effect of the flaps 48 and 54, may be calibrated by using known airflows. By placing the apparatus 10 in known airflows, and by measuring the pressure drop across the apparatus at the known airflows with the flaps open and with the flaps closed, it has been determined that there is a repeatable flow resistance ratio which may be attributed to the presence of the apparatus 10 on the airflow and to the open or closed condition or status of the flaps. That is, the ratio of the pressure drops with the flaps open and the flaps closed provides a repeatable flow resistance ratio. Accordingly, the repeatable flow resistance ratio may be applied to airflows measured with the flaps open and with the flaps closed to compensate or correct airflow readings for the back pressure due to the presence of the apparatus 10. The predetermined correction factor calculations are programmed into the data processor and are used when the back pressure compensated flow measurements are desired.

It will be noted that when flow measurements are desired, the apparatus 10 must be used. In order to insure that flow measurements are only provided when the meter 70 is connected to the apparatus 10, a flap connector cable 62 extends from an electrical switch 60 to the meter 70. The electrical switch 60 is actuated by an actuator cam 64 connected to the linkage between the actuator knob 40 and the link 42.

The presence of the flaps is indicated to the meter when the cable 62 is plugged into the meter 70. The position of the flaps either open or closed, is indicated by the open or closed position or condition of the electrical switch 60.

The actuator cam 64 preferably includes a pair of detents and a spring-loaded detent element to insure that the flaps are actuated to the fully open or fully closed position. The detents provide a positive indication to the user of the apparatus 10 of the fully open and fully closed positions of the flaps 48 and 54.

Referring again to FIG. 2, a temperature probe 118 is shown extending outwardly from the rear of the meter 70. Adjacent to the temperature probe 70 is a humidity probe 119. The probes 118 and 119 may be combined into a single probe, if desired.

The temperature probe and the humidity probe are used to sense the temperature and humidity of the sampled air for display and also to correct flow and velocity for air density.

It will be noted, as shown in FIG. 2, that the flaps 48 and 54 include a number of cutout portions 56. When the flaps are in the closed (horizontal) position, the cutout portions 56 are disposed adjacent to arms or arm elements of the pressure sampling manifold 34. The cutout portions 56 allow the air to flow relatively unrestricted past the manifold grid 34 so as not to interfere with the pressure sampling function of the grid 34. A relatively linear flow of air is accordingly maintained over the grid manifold 34. The cutouts 56 help to prevent a horizontal flow of air in the area of the pressure sampling orifices in the arms or arm elements of the manifold 34 which could cause erroneous pressure measurement data.

DATA PROCESSING

FIG. 4 is an enlarged front view of the meter 70. It will be noted that the term "meter" as used herein is a generic or collective term referring to the unit which contains the data processing functions and the elements associated therewith. Within the meter housing are included microprocessors and circuitry for performing the various arithmetic computations required. Also within the housing are environmental sensing transducers, sensors, and amplifier circuits. For convenience hereafter, the term "microprocessor" will be used to collectively designate the logic and information processing elements.

The meter 70 is removable from the base 20 and may be hand-held for certain applications. These will also be discussed in detail below in conjunction with various other pressure sampling elements of the apparatus of the present invention.

The meter 70 includes two housing portions, a front housing portion 72 and a rear housing portion 76. The meter housing portions 72 and 76 comprise a housing separable or removable from the base 20, as mentioned above and as will be discussed below in conjunction with other pressure sensing elements. The front housing portion 72 includes a front panel 74. At the top or upper portion of the front panel 72 is a display panel 80 which includes a plurality of segments for providing a digital visual readout. Such digital readout displays are well known and understood. The visual readout provided is in terms of instructions and specific data, all in accordance with the programmed features of the microprocessor and in accordance with the instructions provided by the user through a plurality of switches. The switches are found on a function switch panel 82, below tee display panel 80.

Eight switches are illustrated. The switches each include at least two functions, referred to for convenience as an upper function and a lower function. In some cases, there are two secondary functions, again upper and lower functions, for the primary upper and lower functions. The eight switches are found in two rows, an upper row and a bottom or lower row, each including four switches. From the bottom left, there is an off/on switch 84, a pitot tube/left (reverse or descending order) recall switch 86, a velprobe-velgrid/right (forward or ascending) recall switch 88, and an automatic/read switch 90. The upper four switches include an upper/lower shift switch 92, a local-standard/flow-temperature switch 94, an English-metric/differential-absolute switch 96, and a clear/average-total switch 98. It will be noted that each switch includes at least two functions, and to differentiate the two functions, the upper half of each switch is light with dark lettering, and the lower half of each switch is dark with light lettering. In other words, the lettering and background of the top and bottom of each switch is different so that the dual functions of each switch may be clearly delineated.

Assuming the apparatus is in its "off" state, pushing or actuating the switch 84 will turn the meter on. Pushing the switch again will turn the meter off. When the meter is first turned on, the bottom functions are automatically provided. However, local density conditions and English units are automatically provided at start. The purpose of each of the switches 84 . . . 98 is to allow a user to select the various modes and functions as desired and to initiate measurements and readings for display.

The shift switch 92 must be pressed to select the upper functions. When in the lower mode, the functions for the switches 94, 96, and 98 automatically alternate. That is, in the lower switch mode, pressing the switch 96 will cause the differential pressure mode to be selected. Pushing the switch 96 a second time will cause the absolute pressure mode to be selected.

To change to the upper key functions, the shift key or switch 92 must be pressed. After the shift switch 92 is pressed, the upper functions are selectable. However, after a single upper function is selected, the meter 70 automatically shifts back to the lower mode. Accordingly, if the alternate functions of an upper key mode are desired, the shift key 92 must be pressed again after selecting the previous function.

Figure 5:
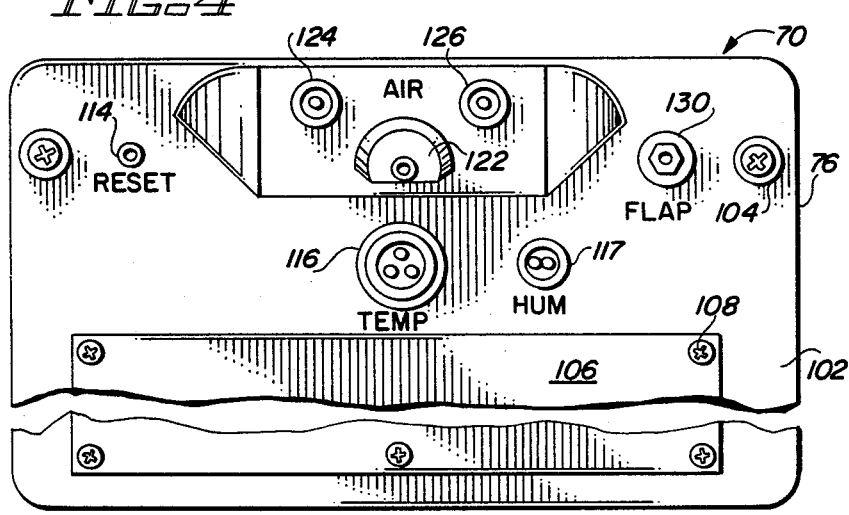
FIG. 5 is an enlarged rear view of the apparatus of FIG. 4.

FIG. 5 is a rear view of the meter 70. The meter 70 is removable from the base 20, as indicated above, for use with various pressure sampling devices, as will be discussed below. The meter 70 includes a rear housing portion 76 which is appropriately secured to the front housing portion by a plurality of fastening elements 104, such as screws. The rear housing portion 76 includes a rear panel 102. The fastening elements 104 extend through the rear panel 102. The rear panel 102 also includes an interior access panel 106. The access panel 106 is appropriately secured to the housing 76 by a plurality of appropriate fastening elements 108, which may also be screws. By removing the interior access panel 106, the interior of the meter 70 is accessible for purposes of replacing batteries.

On the side of the meter 70 are two jacks, a battery charger jack 110 on one side, and an external read jack 112 on the opposite side. A battery charger may be plugged into the jack 110 to recharge batteries within the meter housing.

As best shown in FIG. 1, the cable 32, connected to the thumb switch 30 of the handle 28, plugs into the jack 102. Depressing or actuating the switch 30 allows a user to take a reading, or a number of readings, without having to actuate the read switch 90 on the front of the function switch panel 82.

A reset switch 114 is disposed within the housing portion 76, and is accessible through an opening in the back panel 102. The purpose of the reset switch 114 is to allow the circuits within the meter housing to be reset in case of accident, memory loss, etc.

Extending outwardly from the rear panel 102 of the housing portion 76 is a temperature probe jack 116. The temperature probe jack 116 receives or is connected to a temperature probe 118, shown in FIG. 2. The temperature probe 118 extends inwardly from the meter 70 into the interior of the housing 20 for sensing the temperature of the airflow within the base 20. The temperature information from the probe 118 is used by the circuitry, under the control of the microprocessor, for providing corrected data, as wil be discussed below.

A humidity probe jack 117 is spaced apart from the temperature probe jack. If desired, both temperature and humidity sensing may be combined, and only a single jack may then be required.

At the upper portion of the meter 70 is a recessed area 120. Extending outwardly from the lower portion of the recessed area is a screw jack boss 122. The purpose of the screw jack boss 122 is to receive a screw element to secure the meter 70 to the base 20. A screw fastener, not shown, extends through the upper portion 22 of the housing 20, and extends into the screw jack portion of the boss 122.

Also extending outwardly from within the rcessed area 120 is a pair of pressure po rts, including a positive pressure port 124 and a negative pressure port 126. The positive pressure port 124 and the negative pressure port 126 connect, respectively, with the conduits or tubes 36 and 38 from the manifold 34. The pressure port 124, labeled "+" connects with the tube or hose 36. The hose 36 is in turn connected to the upper or upstream portion of the manifold 34, and accordingly recieves total pressure of the air flowing downwardly through the hood apparatus 10, as shown in FIGS. 1 and 2. The port 126, labeled "—" is connected to the tube or hose 38. The tube or hose 38 is in turn connected to the lower or downstream portion of the manifold 34, and accordingly senses the static pressure of the air flowing through the apparatus 10.

It will be noted that the term "static" pressure, as used throughout the specificaiton and claims, often refers to leeside pressure, instead of true static pressure. However, the difference between true static pressure and leeside pressure is corrected for, or is compensated for, in the microprocessors by appropriate calculations. Accordingly, the term "static pressure" is used throughout the specification and claims with virtual impunity.

The apparatus of the present invention measures airflow in two directions and it is thus important how the pressure sensing elements are connected to the meter 70. In order to maintain correct or consistent arithmetic sign values and correct effective area factors, the total pressure must be connected to the port 124, and the static pressure must be connected to the port 126.

A flaps jack 130 is also located ont he back of the housing portion 102. Unless the flap cable 62 is connected to the jack 130, volume airflow data may not be provided.

Velocity Air Pressure Sampling Devices

Figure 6:
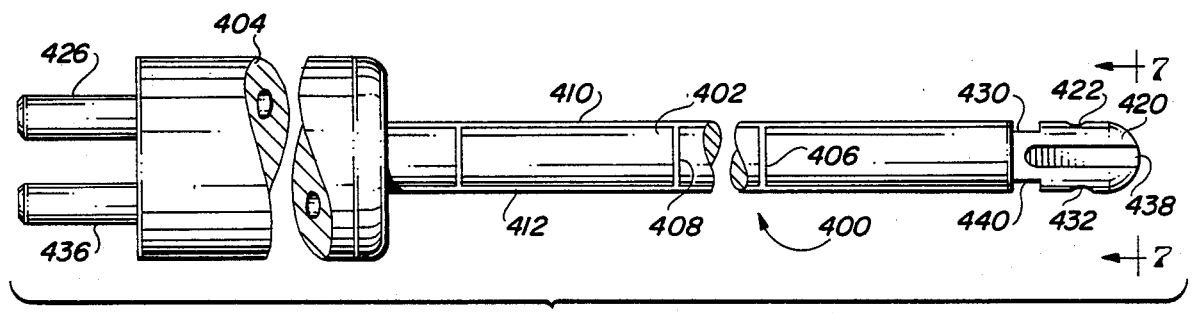
FIG. 6 is a side view, partially broken away, of another portion of the apparatus of the present invention.

FIG. 6 is a side view of an elongated probe-type air pressure sampling apparatus 400 which may be used in place of the manifold 34 with the meter housing 70. The meter housing 70 may be removed from the base 20, and a pair of tubes such as the tubes 36 and 38, except substantially longer, may be connected to the probe apparatus 400. The probe apparatus 400 is sometimes referred to as a velprobe air sampling device.

Figure 8:
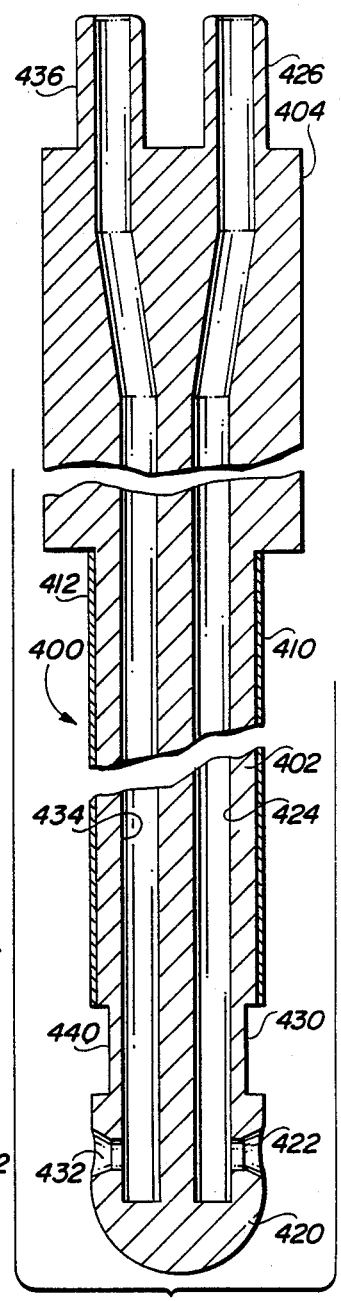
FIG. 8 is a view in partial section taken generally along line 8—8 of FIG. 9.

FIG. 7 is an end view of the probe apparatus 400 taken generally along line 7—7 of FIG. 6. It comprises a front elevational view of the probe apparatus 400. FIG. 8 is a view in partial section taken generally along line 8—8 of FIG. 7. It comprises a side view in partial section of the probe device 400. For the following discussion, reference will be made primarily to FIGS. 6, 7, and 8.

The elongated probe apparatus 400 includes a housing or wand or rod 402 connected to a handle 404. The housing or wand or rod 402 is relatively small in diameter in comparison to the diameter of the handle 404. The handle 404 is of a size, both in length and in diameter, as to be comfortable to a user of the apparatus.

On the exterior of the handle 404 is a plurality of spaced-apart bands. Two of the bands, a band 406 and a band 408 are shown in FIG. 6. The bands, such as the bands 406 and 408, extend circumferentially about the wand or rod 402. The bands are preferably spaced apart a predetermined distance, such as one inch. The bands are situated along the entire length of the wand or rod 402 to enable a user of the apparatus to make relatively accurate positioning of the wand. For example, if a plurality of readings are to be taken within a duct, the wand 402 may be extended through a relatively small diameter opening in the duct a first predetermined distance, then a second predetermined distance, etc., with the distances based on the spacing between the bands.

It will be understood that the size of the air pressure sampling apparatus 400 illustrated in the drawings is greatly exaggerated. In actuality, the diameter of the wand portion is about 5/16 of an inch (0.85 centimeters), and the diameter of the handle 404 is about one inch (2.5 centimeters). The length of the wand is preferably about 18½ inches (47 centimeters), and the length of the handle 404 is preferably about 2½ inches (70 centimeters). Obviously, any length and diameter may be utilized, as practical, in accordance with the desires of the user.

At the distal end of the rod 402, remote from the handle 404, is a tip 420. The tip 420 includes a pair of ports, including an upper port 422 and a bottom port 432. The ports are aligned vertically with each other, as best shown in FIG. 7.

The ports 422 and 432 communicate respectively with a pair of tubes or bores 424 and 434. The bores or tubes 424 and 434 extend rearwardly from the tip 420 through the housing or wand or rod 402 and to and through the handle 404. The tubes or bores 424 and 434 then extend to a pair of port bosses, including, respectively, an upper port boss 426 and a lower port boss 436.

The port bosses 426 and 436 extend rearwardly from the handle 404 and are in turn connected to hoses or tubes, such as the tubes 36 and 38, which connect the probe apparatus 400 with the conduits of the differential pressure transducer 150.

Figure 9:
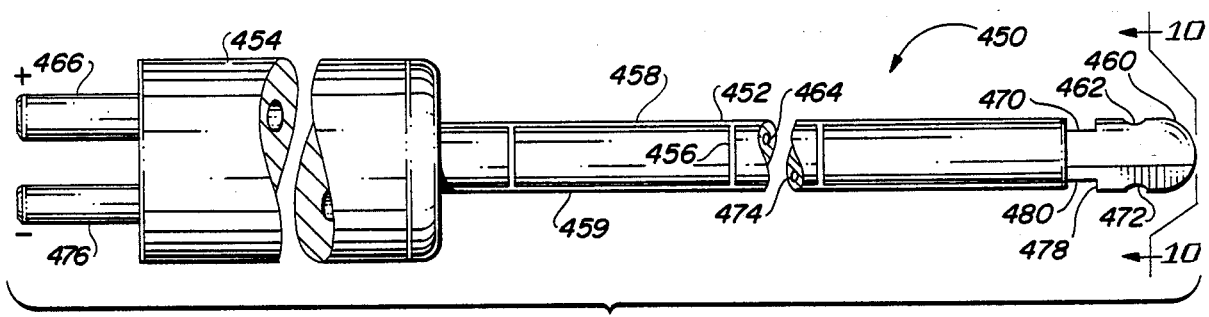
FIG. 9 is a side view, partially broken away, of an alternate embodiment of the apparatus of FIGS. 6, 7, and 8.

A pair of slots 428 and 438, best shown in FIGS. 8 and 9, extend rearwardly along the side of the tip 420. The slots extend radially inwardly along the tip and extend rearwardly generally parallel to the longitudinal axis of the tip and the wand or rod 400. The slots 428 and 438 are symmetrical with each other and are disposed symmetrically with respect to the ports 422 and 432, as best shown in FIGS. 6. and 7. The slots 428 and 438 are accordingly disposed substantially half-way, or between, the ports 422 and 432.

The purpose of the slots 428 and 438 is to cause a controlled separation of the boundary layer of air flowing over the tip 420. As the manifold apparatus 400 is disposed in an air stream, the ports 422 and 432 will be aligned generally parallel to the flow of air. The slots 428 and 438 accordingly will be generally perpendicular or normal to the flow of air. The air flowing over the tip 402 includes a boundary layer adjacent to the tip 420. The controlled separation of the boundary layer insures a consistant velocity generated pressure differential relationship over a wide range of operating velocities. The upstream port 422 senses the total pressure of the airflow, while the downstream port 432 senses the static pressure.

It will be noted that the tip 420 is substantially symmetrical in all respects. That is, the ports 422 and 432 are disposed generally 180 degrees apart, and the slots or recesses 428 and 438 are also disposed substantially 180 degrees apart, and they are equally spaced between the ports 422 and 432. Accordingly, the probe 400 is generally symmetrical, and it makes no difference which way the probe is oriented in an airflow. That is, either port 422 or 432 may be considered as the upper or total pressure port, while the other port may be designated as the downstream or static pressure port.

The slots 428 and 438 are used to control the separation of the boundary layer of air about the tip so as to prevent inaccuracies in the reading of the static pressure through the downstream port. Such inaccuracies could occur if the boundary layer separation is not controlled.

Rearwardly of the ports 422 and 432, and adjacent to the juncture of the rod 402 with the tip 420, are a pair of laterally extending slots 430 and 440. The slots extend substantially perpendicular to the longitudinal axis of the rod 402 and are spaced apart slightly a relatively short distance rearwardly from the ports 422 and 432.

The slots 430 and 440 control the boundary layer separtion of any airflow longitudinally of, or along, the rod 402. This interrupts and modifies any axial airflow across the ports 422 and 432 to minimize the effects of the axial airflow.

Figure 11:
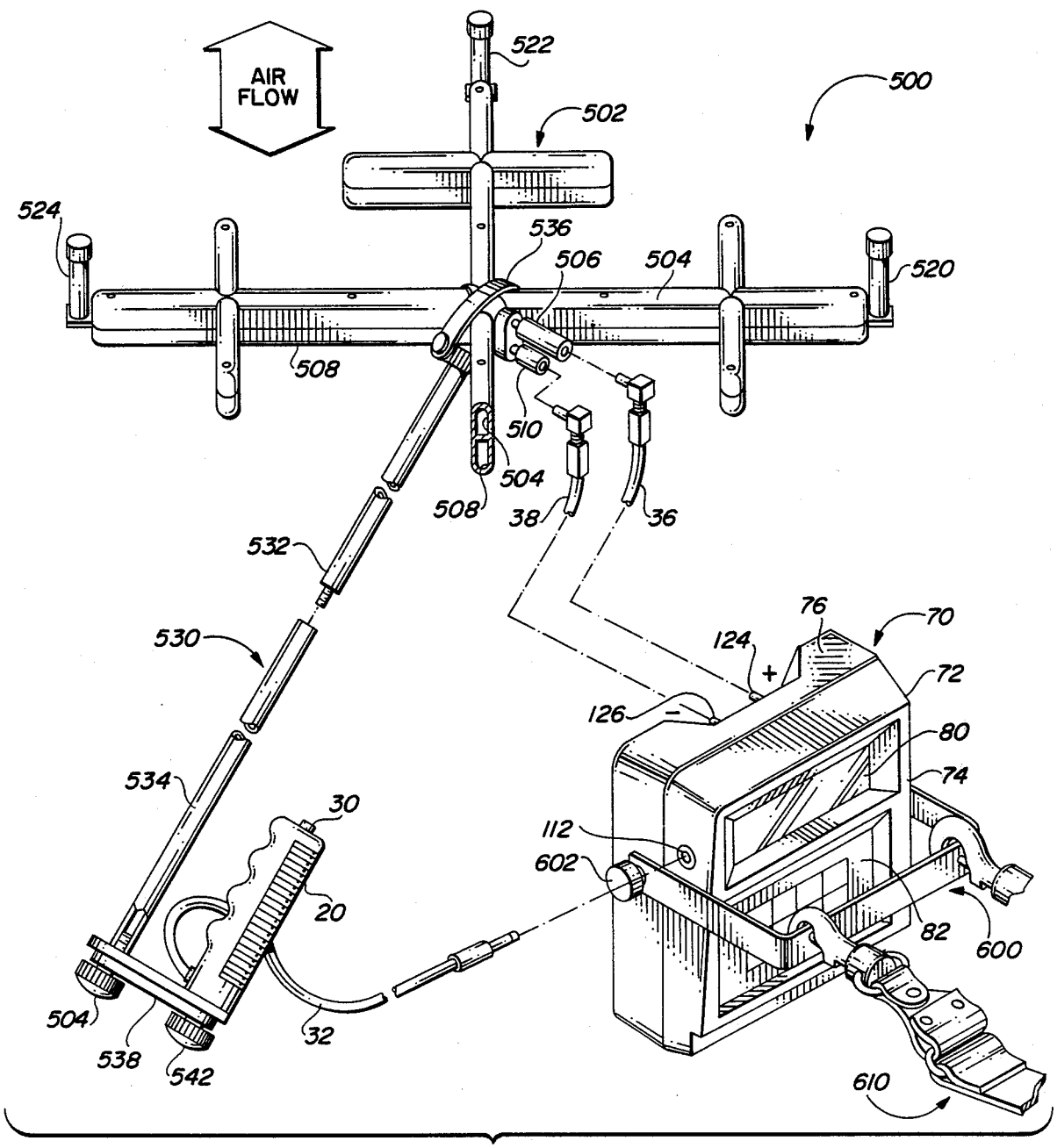
FIG. 11 is a perspective view of another embodiment of the apparatus of the present invention.

An alternate embodiment of the manifold apparatus 400 is illustrated in FIGS. 9 and 10. FIG. 9 is a side view of a probe manifold 450. The manifold 450 includes a rod or wand or housing 452, which is substantially identical to the wand or housing or rod portion 402 of the probe manifold 400. The wand or rod 452 also includes a handle 454. The handle 454 is connected to one end of the housing or wand or rod 452, and a tip 460 is secured to the distal end of the wand or rod 452 remote from the handle 454. A plurality of spaced apart bands extend circumferentially around the wand or rod 452. One such band, a band 456, is shown in FIG. 11. The bands are, obviously, for substantially the same purpose 400. That is, they are spaced apart predetermined distances, such as the bands, such as the bands 406 and 408, of the probe manifold as one inch, etc., so that the specific lengths or distances of the tip away from a predetermined location, such as a conduit wall, may be determined.

FIG. 10 is a front view of the probe manifold 450, taken generally along line 10—10 of FIG. 9. It comprises a front elevational view of the probe 50 at the tip 460. For the following discussion, reference will be made to both FIGS. 9 and 10.

A pair of ports 462 and 472 are shown in FIGS. 9 and 10. The ports 462 and 472 are substantially 180 degrees apart. The port 462 is the upstream or total pressure port, and the port 472 is the downstream or static pressure port. The ports 462 and 472 communicate with a pair of axially extending tubes or bores 464 and 474, respectively, which extend through the wand or rod 452. The bores or tubes 464 and 474 are shown in phantom in FIG. 10.

The tubes or bores 464 and 474 extend axially through the wand or rod 452 and to and through the handle 454 to communicate respectively with the pair of port bosses 466 and 476. In FIG. 11, the port or bore 466 is labeled with a "plus" and the port boss 476 is labeled with a "minus" sign. The port 466 will always be the upstream or velocity pressure port, and the port 476 will always be the downstream or static port due to the configuration of a pair of boundary layer separation slots.

The pair of boundary layer separation slots, including a slot 468 and a slot 478 are shown in FIG. 10. The slot 478 is also shown in FIG. 9. The slots 468 and 478 extend inwardly into the tip 460, but they are not symmetrical. The slots 468 and 478 are equally spaced from the downstream or static port 472, and they are respectively also equally spaced apart from the upstream or velocity pressure port 462. However, the slots 468 and 478 are not spaced equally distant apart. That is, they are both at the same radial distance from the upstream port, and they are also equally spaced from the downstream port 472. However, they are not equidistance between the two ports. Obviously, as may be seen in FIGS. 9 and 10, the slots 468 and 478 are much closer to the downstream port 472 than they are to the upstream port 462.

The slots 468 and 478 also control the separation of the boundary layer of the air flowing over the tip 460. However, the controlled separation of the boundary layer places the boundary air much closer to the downstream port 472 than it does to the upstream port 462. The probe manifold 450 accordingly is not symmetrical. Rather, it is "polarized" in that the port 462 should always be the upstream or total pressure port, and the port 472 should always be the downstream or static pressure port. This necessitates the labeling of the port bosses 466 and 476 with a plus sign and a minus sign respectively.

Both the probe apparatus 400 and the probe apparatus 450 may include longitudinally extending lines aligned with the ports on the tip to insure that the manifolds are aligned properly with respect to the flow of air in a duct, etc. Thus, in addition to the spaced-apart circumferentially extending bands, a pair of longitudinally or axially extending lines may also be incorporated into the apparatus. A top line 410 and a bottom line 412 are shown extending axially along the probe apparatus 400 in FIG. 6. A top line 458 and a bottom line 459 are shown extending axially along the probe apparatus 450 in FIG. 9.

Rearwardly of the ports 462 and 472, and disposed at the juncture of the rod 452 and the tip 460, are a pair of laterally extending slots 470 and 480. The slots 470 and 480 extend transversely or perpendicularly to the longitudinal axis of the rod or wand 452 and the tip 460. The slots 462 and 472 are spaced apart one hundred eighty degrees from each other, and are accordingly symmetrical with respect to the knobs 460 and to the ports 462 and 472 and the slots 468 and 478.

The slots 470 and 480 insure that there is a separation of any air which may flow axially with respect to the rod 452 so that the pressure sensed through the port 462 is not adversely affected by an axial flow of air. The slots 470 and 480 act in substantially the same manner as do the slots 430 and 440 of the apparatus 400. They control the boundary layer separation of any longitudinal airflow along the rod 402 to interrupt or modify any such longitudinal or axial airflow across the ports or orifices 422 and 432 in order to emphasize the effects of such axial airflow.

Referring to FIGS. 7 and 10, in particular, it will be noted that the placement of the ports or orifices 422, 432 and 462, 472 may provide a gain control function in the pressure differential sensing. By locating the pressure sensing ports or orifices 422 and 432, and the ports or orifices 462 and 742 at other than one hundred eighty degrees apart, respectively, there is a ratio or gain provided in the differential pressure sensed. Thus, the appropriate angular relationship between the sensing orifices or ports may provide a two or three, etc. gain ratio between the sensed pressures.

FIG. 11 is a perspective view of a "velgrid" pressure sampling device 500 usable with the meter 70 of the present invention. The velgrid pressure sensing device 500 includes a manifold grid 502 which is substantially identical to the manifold grid 34, discussed above in conjunction with the flow measuring apparatus 10. The manifold grid 502 includes four standoff feet secured to the distal ends of the four arms of the manifold grid. The standoff feet include a foot 520, a foot 522, and a foot 524, all of which are illustrated in FIG. 13. The fourth foot is not shown. The feet are used for spacing the manifold grid 502 at a predetermined distance from the face of a filter, or the like. Also, the use of the standoff feet insures that the grid apparatus 502 is aligned substantially perpendicular to the flow of air from the filter when all of the feet are disposed against a filter.

A handle 530 is shown secured to the manifold grid 502 by a harness 536. The harness 536 is disposed at the juncture of the four arms of the grid 502. The handle includes two portions, a rod portion 532 and a rod portion 534. A threaded connection secures the rod portions together. The harness 536 is secured to the rod portion 534. The handle 28 is secured to the rod portion 534 by means of an adapter plate 538, and a pair of screws 540 and 542. The screw 540 is used to secure the plate 538 to the rod portion 534, and the screw 542 is used to secure the handle 28 to the plate 538. The screw 542 may also be used to secure the handle 28 to the bracket plate 2, shown in FIGS. 1 and 2.

By removing the meter 70 from the base 20, the meter 70 may be used with either the velprobe apparatus 400 illustrated in FIGS. 6, 7, and 8, the velprobe apparatus 450 illustrated in FIGS. 9 and 10, or with the velgrid apparatus 500 illustrated in FIG. 11. With the velgrid apparatus 500, the handle 28 may be secured to the elongated handle 530, which is in turn secured to the velgrid manifold 502 so that a user may refer to the meter by holding the meter in one hand, and may, with the other hand, hold the handle 28 and thus position the velgrid manifold 502 as desired. By actuating the thumb switch 30, the meter 70 may be signaled to take a reading. A number of readings may be thus taken, without resorting to actuating the read switch 90 on the function switch panel 82. Obviously, to utilize the handle 28 and its read thumb switch 30, the cable 32, or actually a longer cable extension, must be appropriately connected to the external read jack 112.

The manifold grid 502 incudes two manifold portions, an upper or total pressure manifold 504 and a lower or static pressure manifold portion 508. The upper-manifold portion 504 includes a port 506 which is connected tot he positive pressure port 124 by the tubing or hose or conduit 36. The lower or static manifold pressure portion 508 includes a port 510 which is appropriately secured to the hose or tubing or conduit 38. The conduit or hose 38 in turn extends to the negative or static pressure port 126 of the meter 70. This is, of course, substantially the same arrangement as illustrated above in conjunction with FIG. 2, and as discussed also in conjunction with FIGS. 6, 7, 8, 9, and 10.

The upper manifold 504 includes a plurality of apertures 512 for sensing pressure, or for communicating the total pressure of the air flow being measured to the upper manifold 504. The lower manifold 508 also includes such apertures (not shown).

A U-shaped handle 600 is shown secured to the meter 70. The handle is screwed to the meter 70 by a pair of screws, of which a screw 602 is shown in FIG. 11. The handle 600 is movable or positionable with respect to the meter 70 and accordingly the meter may be used to stand alone, by using the handle 600 as a foot, or, as illustrated in FIG. 11, the handle 600 may be used to secure the meter 70 to a user by means of a harness 610. The harness 610 includes a neck strap which is appropriately secured to the handle 600, as by a pair of snap fasteners, etc. The harness 610 is, of course, removable so that the meter may be used without the harness, or as desired.

As discussed above, the velprobe embodiments 400 and 450 and the velgrid embodiment 500 are pressure sampling devices used to provide air velocity information. Since there is no controlled or known area with which the velprobe and velgrid embodiments are used, volume airflow may not be directly measured by the meter when using them as air sampling devices. However, the volume airflow can be calculated by multiplying the average velocity by the measured area.

The velprobe embodiments include only a single pair of sampling ports, and accordingly a single location is sampled at any one time. With the velgrid apparatus 500, a plurality of sampling ports are contained in the grid apparatus, and accordingly airflow samples are taken over a relatively large area and are appropriately averaged in the respective upper and lower manifold portions. The pressure differential sensed between the upper manifold grid portion and the lower manifold grid portion accordingly comprises an average pressure over a much greater area than can be sampled at any one time by either the velprobe apparatus 400 or the velprobe apparatus 450.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What we claim is:

1. Probe means for sampling air pressure of an airflow, including, in combination:
    a generally elongated wand having a longitudinal axis and having a first end and a second end and a tip at the first end;
    a first bore in the wand extending from the tip at the first end to the second end &or communicating a first pressure;
    a second bore in the wand extending from the tip at the first end to the second end for communicating a second pressure;
    a first port at the first end communicating with the first bore for sensing the first pressure;
    a second port at the first end communicating with the second bore for sensing the second pressure; and
    slot means for controlling the separation of boundary layer airflow between the first and second ports.

2. The apparatus of claim 1 in which the slots means for controlling the separation of boundary layer airflow includes slot extending substantially perpendicular to the longitudinal axis of the wand.

3. The apparatus of claim 2 in which the means for controlling the separation of boundary layer airflow incudes a pair of slots on the tip generally symmetrical with respect to each other and to the first and second ports.

4. The apparatus of claim 2 in which the means for controlling the separation of boundary layer airflow includes a pair of slots on the tip which are unsymmetrical with respect to each other and to the first and second ports.

5. The apparatus of claim 1 in which the slot means for controlling the separation of boundary layer airflow includes slot means extending substantially perpendicular to the longitudinal axis of the wand.

6. The apparatus of claim 5 in which the slot means includes a slot adjacent to the first port and a slot adjacent to the second port.

7. The apparatus of claim 1 in which the wand includes a plurality of bands extending circumferentially about the wand and spaced apart from each other first predetermined distances for positioning the ports into the airflow a second predetermined distance.

8. The apparatus of claim 1 in which the wand includes longitudinally extending lines aligned with the ports for orienting the wand with respect to the airflow.

* * * * *